United States Patent
Hong et al.

(10) Patent No.: US 11,039,366 B2
(45) Date of Patent: Jun. 15, 2021

(54) METHOD AND APPARATUS FOR RESELECTING PATH FOR IAB RELAYING IN WIRELESS COMMUNICATION SYSTEM

(71) Applicant: LG ELECTRONICS INC., Seoul (KR)

(72) Inventors: Jongwoo Hong, Seoul (KR); Taehun Kim, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/391,150

(22) Filed: Apr. 22, 2019

(65) Prior Publication Data

US 2019/0327660 A1 Oct. 24, 2019

(30) Foreign Application Priority Data

Apr. 23, 2018 (KR) .................. 10-2018-0046555

(51) Int. Cl.
*H04W 36/30* (2009.01)
*H04L 12/24* (2006.01)
*H04L 5/00* (2006.01)

(52) U.S. Cl.
CPC ........... *H04W 36/30* (2013.01); *H04L 5/0048* (2013.01); *H04L 41/0813* (2013.01)

(58) Field of Classification Search
CPC ... H04W 36/30; H04L 5/0048; H04L 41/0813
USPC .......................................................... 370/331
See application file for complete search history.

(56) References Cited

U.S. PATENT DOCUMENTS

| | | | |
|---|---|---|---|
| 7,646,752 B1* | 1/2010 | Periyalwar ............ | H04L 41/044 370/338 |
| 2006/0160541 A1* | 7/2006 | Ryu ....................... | H04W 36/30 455/446 |
| 2008/0062996 A1* | 3/2008 | Kaippallimalil ........ | H04L 45/28 370/395.1 |
| 2012/0099425 A1* | 4/2012 | Wang ..................... | H04L 12/437 370/225 |
| 2014/0071827 A1* | 3/2014 | Alpert ..................... | H04L 45/22 370/237 |
| 2016/0345192 A1* | 11/2016 | Garg ...................... | H04W 24/04 |
| 2018/0176090 A1* | 6/2018 | Lessmann ............... | H04L 45/02 |
| 2018/0270875 A1* | 9/2018 | Hampel ................. | H04W 84/18 |
| 2020/0196217 A1* | 6/2020 | Schwengler .......... | H04W 84/18 |

* cited by examiner

*Primary Examiner* — Chi Tang P Cheng
(74) *Attorney, Agent, or Firm* — Lee Hong Degerman Kang Waimey

(57) ABSTRACT

A method and apparatus for reselecting a path for an integrated access and backhaul (IAB) relaying in a wireless communication system is provided. An IAB node configures a criteria of path reselection among multiple nodes, receives information from the multiple nodes, and performs the path reselection based on the criteria by using the information received from the multiple nodes and cell quality of the multiple nodes.

18 Claims, 9 Drawing Sheets

METHOD AND APPARATUS FOR RESELECTING PATH FOR IAB RELAYING IN WIRELESS COMMUNICATION SYSTEM

CROSS-REFERENCE TO RELATED APPLICATIONS

Pursuant to 35 U.S.C. § 119 (a), this application claims the benefit of earlier filing date and right of priority to Korean Patent Application No. 10-2018-0046555, filed on Apr. 23, 2018, the contents of which are hereby incorporated by reference herein in its entirety.

BACKGROUND OF THE INVENTION

Field of the Invention

The present invention relates to wireless communications, and more particularly, to a method and apparatus for reselecting a path for an integrated access and backhaul (JAB) relaying in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

One of the potential technologies targeted to enable future cellular network deployment scenarios and applications is the support for wireless backhaul and relay links enabling flexible and very dense deployment of NR cells without the need for densifying the transport network proportionately.

Due to the expected larger bandwidth available for NR compared to LTE (e.g. mmWave spectrum) along with the native deployment of massive multiple-input multiple-output (MIMO) or multi-beam systems in NR creates an opportunity to develop and deploy integrated access and backhaul (IAB) links. This may allow easier deployment of a dense network of self-backhauled NR cells in a more integrated manner by building upon many of the control and data channels/procedures defined for providing access to UEs. Due to deployment of IAB links, relay nodes can multiplex access and backhaul links in time, frequency, or space (e.g. beam-based operation).

SUMMARY OF THE INVENTION

For IAB, relay path reselection should be considered as important since IAB nodes are connected with multiple hops. The conventional cell reselection only considers cell quality (e.g. reference signal received power (RSRP)), but this may not be appropriate for IAB relay path reselection. That is, it may be required to perform IAB relay path reselection by considering various factors other than cell quality.

In an aspect, a method performed by a node in a wireless communication system is provided. The method includes configuring a criteria of path reselection among multiple nodes, receiving information from the multiple nodes, and performing the path reselection based on the criteria by using the information received from the multiple nodes and cell quality of the multiple nodes.

In another aspect, a node in a wireless communication system is provided. The node includes a memory, a transceiver, and a processor, operably coupled to the memory and the transceiver, and configured to configures a criteria of path reselection among multiple nodes, controls the transceiver to receive information from the multiple nodes, and perform the path reselection based on the criteria by using the information received from the multiple nodes and cell quality of the multiple nodes.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
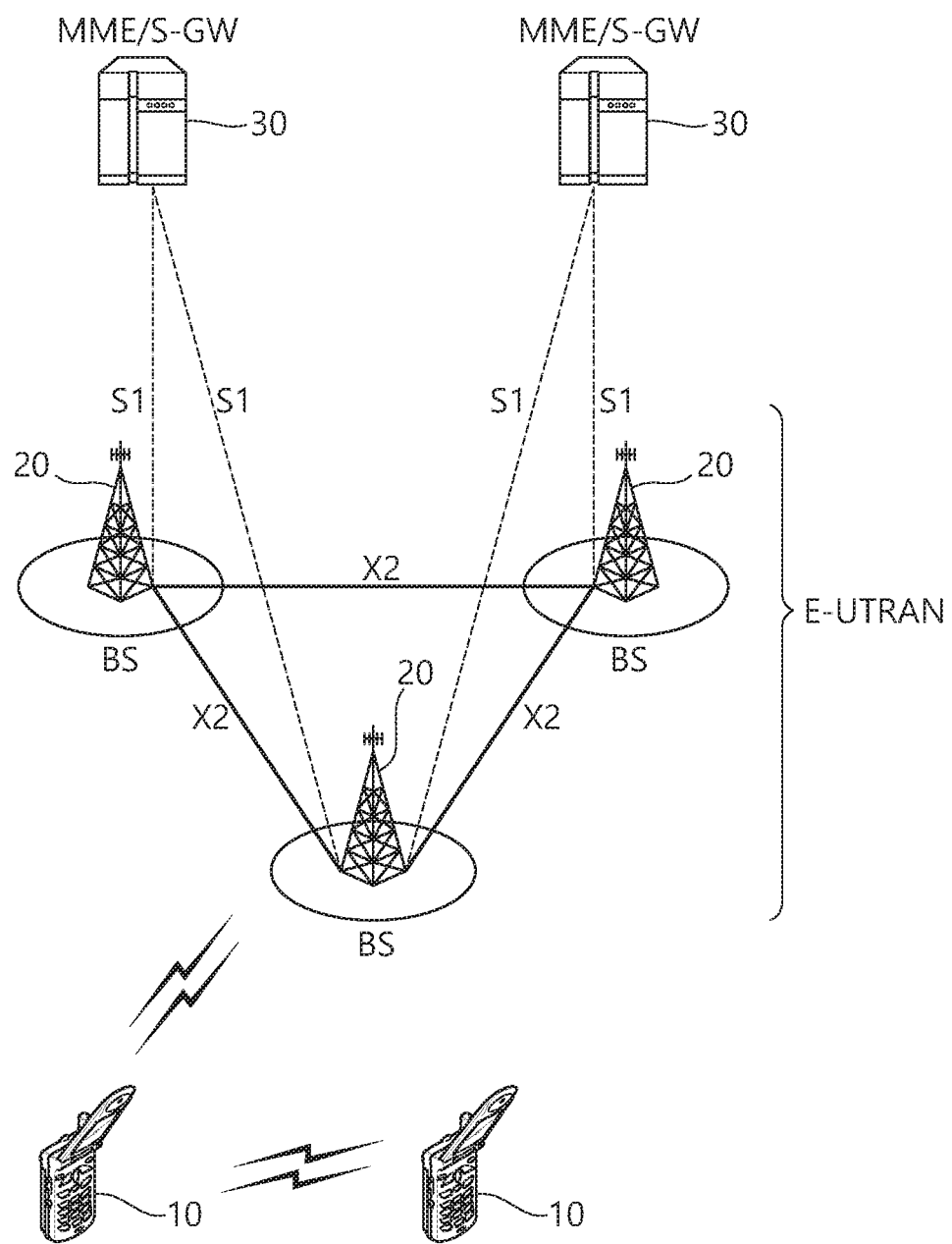
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
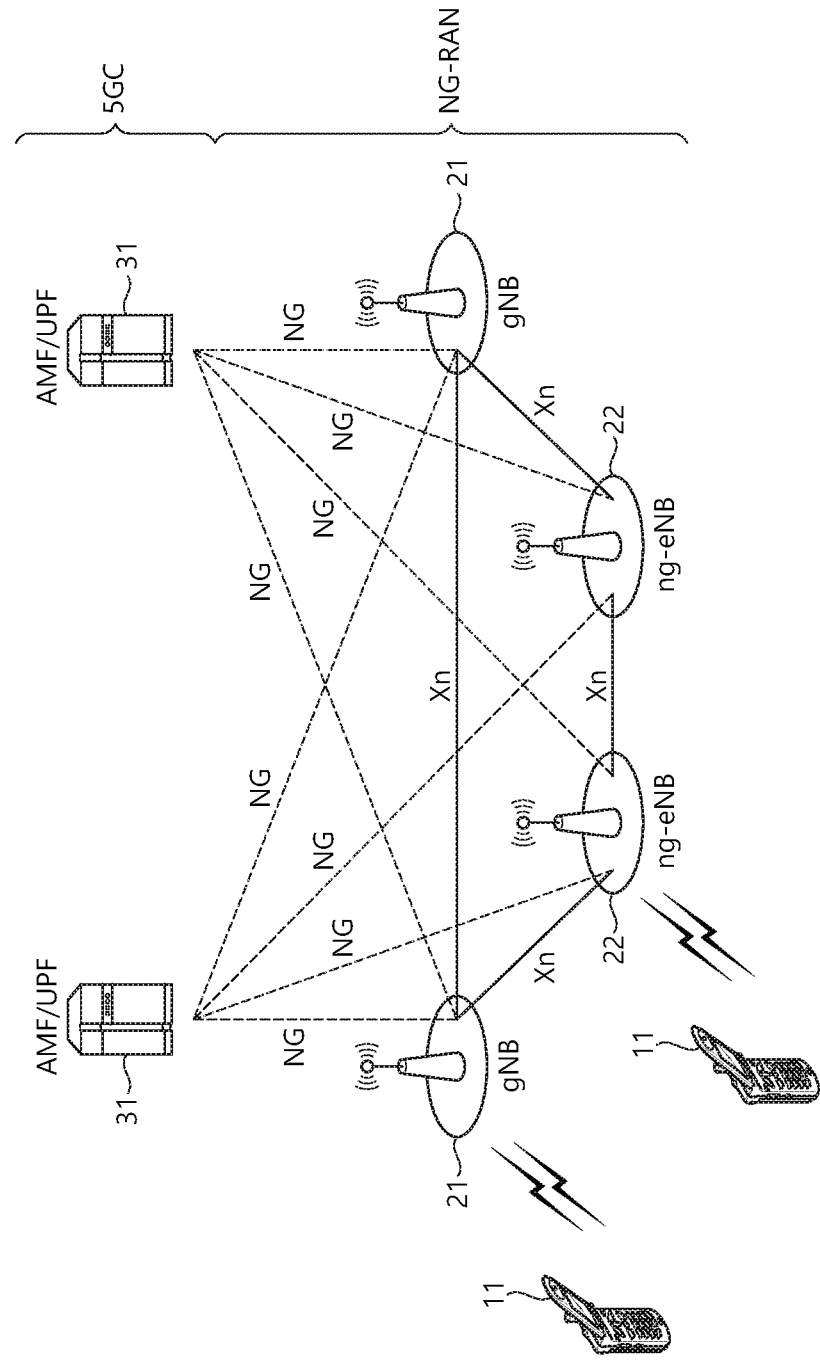
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
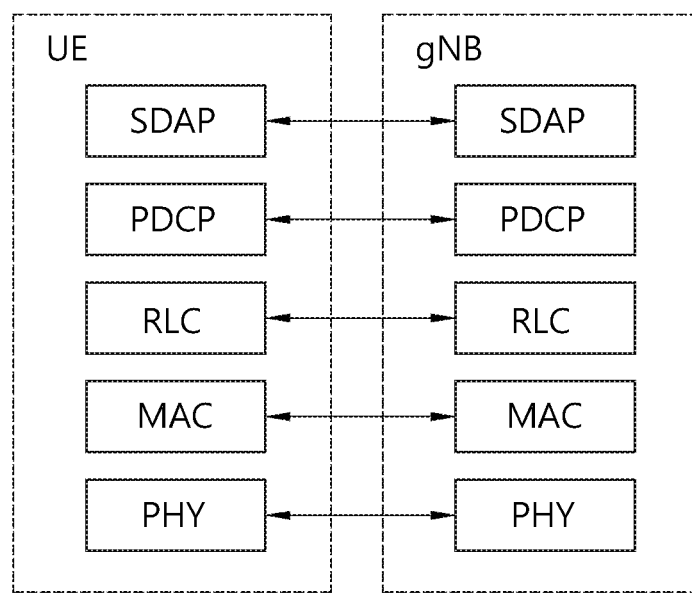
FIG. 3 shows a block diagram of a user plane protocol stack to which technical features of the present invention can be applied.
Figure 4:
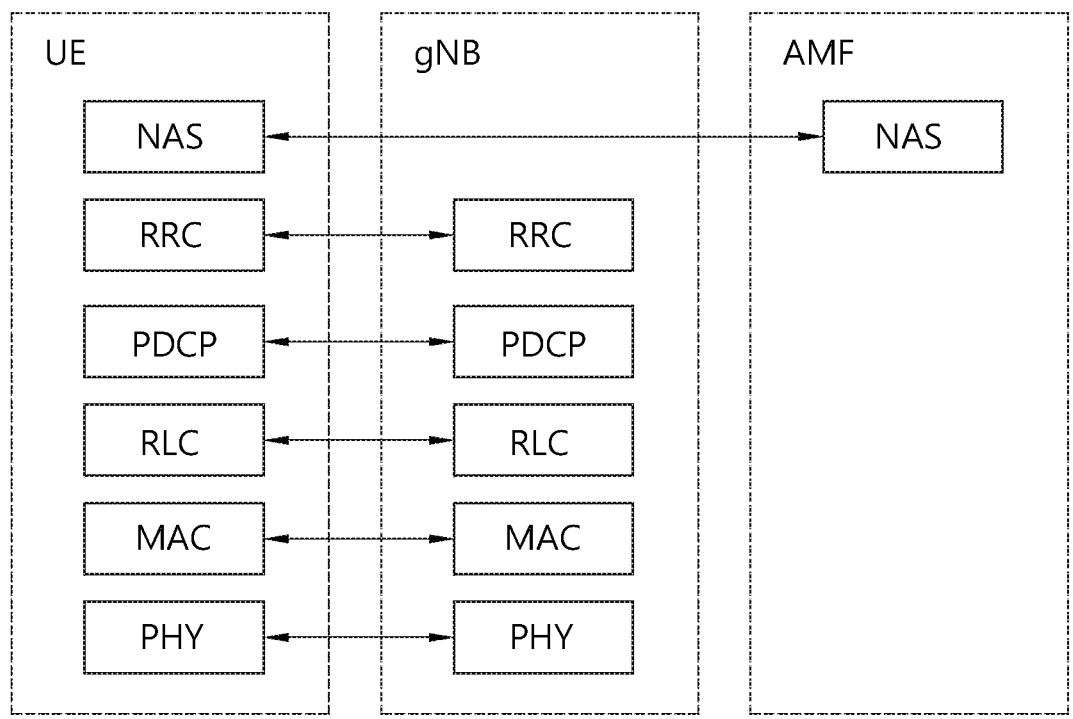
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Cell reselection evaluation process is described.

Reselection priorities handling is described. Absolute priorities of different NR frequencies or inter-RAT frequencies may be provided to the UE in the system information, in the RRC Connection Release message, or by inheriting from another RAT at inter-RAT cell (re)selection. In the case of system information, a NR frequency or inter-RAT frequency may be listed without providing a priority (i.e. the field cellReselectionPriority is absent for that frequency). If priorities are provided in dedicated signaling, the UE shall ignore all the priorities provided in system information.

The UE shall only perform cell reselection evaluation for NR frequencies and inter-RAT frequencies that are given in system information and for which the UE has a priority provided.

The UE shall delete priorities provided by dedicated signaling when:
 the UE enters RRC_CONNECTED state; or
 a PLMN selection is performed on request by NAS.
Equal priorities between RATs are not supported.

The UE shall only perform cell reselection evaluation for NR frequencies and inter-RAT frequencies that are given in system information and for which the UE has a priority provided.

The UE shall not consider any black listed cells as candidate for cell reselection.

The UE shall inherit the priorities provided by dedicated signaling at inter-RAT cell (re)selection.

The network may assign dedicated cell reselection priorities for frequencies not configured by system information.

Measurement rules for cell re-selection is described. When evaluating Srxlev and Squal of non-serving cells for reselection purposes, the UE shall use parameters provided by the serving cell.

Following rules are used by the UE to limit needed measurements:

1> If the serving cell fulfils Srxlev>$S_{IntraSearchP}$ and Squal>$S_{IntraSearchQ}$, the UE may choose not to perform intra-frequency measurements.

1> Otherwise, the UE shall perform intra-frequency measurements.

1> The UE shall apply the following rules for NR inter-frequencies and inter-RAT frequencies which are indicated in system information and for which the UE has priority provided:

2> For a NR inter-frequency or inter-RAT frequency with a reselection priority higher than the reselection priority of the current NR frequency the UE shall perform measurements of higher priority NR inter-frequency or inter-RAT frequencies.

2> For a NR inter-frequency with an equal or lower reselection priority than the reselection priority of the current NR frequency and for inter-RAT frequency with lower reselection priority than the reselection priority of the current NR frequency:

3> If the serving cell fulfils Srxlev>$S_{nonIntraSearchP}$ and Squal>$S_{nonIntraSearchQ}$, the UE may choose not to perform measurements of NR inter-frequencies or inter-RAT frequency cells of equal or lower priority.

3> Otherwise, the UE shall perform measurements of NR inter-frequencies or inter-RAT frequency cells of equal or lower priority.

Cells with cell reservations, access restrictions or unsuitable for normal camping is described. For the highest ranked cell (including serving cell) according to cell reselection criteria, for the best cell according to absolute priority reselection criteria, the UE shall check if the access is restricted.

If that cell and other cells have to be excluded from the candidate list, the UE shall not consider these as candidates for cell reselection. This limitation shall be removed when the highest ranked cell changes.

If the highest ranked cell or best cell according to absolute priority reselection rules is an intra-frequency or inter-frequency cell which is not suitable due to being part of the "list of 5GS forbidden TAs for roaming" or belonging to a PLMN which is not indicated as being equivalent to the registered PLMN, the UE shall not consider this cell and other cells on the same frequency, as candidates for reselection for a maximum of X seconds. If the UE enters into state any cell selection, any limitation shall be removed. If the UE is redirected under NR control to a frequency for which the timer is running, any limitation on that frequency shall be removed.

If the highest ranked cell or best cell according to absolute priority reselection rules is an inter-RAT cell which is not suitable due to being part of the "list of forbidden TAs for roaming" or belonging to a PLMN which is not indicated as being equivalent to the registered PLMN, the UE shall not consider this cell as a candidate for reselection for a maximum of X seconds. If the UE is redirected under NR control to a frequency for which the timer is running, any limitation on that frequency shall be removed.

NR Inter-frequency and inter-RAT cell reselection criteria is described. If threshServingLowQ is broadcast in system information and more than 1 second has elapsed since the UE camped on the current serving cell, cell reselection to a cell on a higher priority NR frequency or inter-RAT frequency than the serving frequency shall be performed if:

A cell of a higher priority NR or EUTRAN frequency division duplex (FDD) RAT/frequency fulfils Squal>Thresh$_{X,\ HighQ}$ during a time interval Treselection$_{RAT}$; or A cell of a higher priority EUTRAN time division duplex (TDD) frequency fulfils Srxlev>Thresh$_{X,\ HighP}$ during a time interval Treselection$_{RAT}$.

Otherwise, cell reselection to a cell on a higher priority NR frequency or inter-RAT frequency than the serving frequency shall be performed if:

A cell of a higher priority RAT/frequency fulfils Srxlev>Thresh$_{X,\ HighP}$ during a time interval Treselection$_{RAT}$; and More than X second has elapsed since the UE camped on the current serving cell.

Cell reselection to a cell on an equal priority NR frequency shall be based on ranking for Intra-frequency cell reselection.

If threshServingLowQ is broadcast in system information and more than 1 second has elapsed since the UE camped on the current serving cell, cell reselection to a cell on a lower priority NR frequency or inter-RAT frequency than the serving frequency shall be performed if:

The serving cell fulfils Squal<Thresh$_{Serving,\ LowQ}$ and a cell of a lower priority NR FDD RAT/frequency fulfils Squal>Thresh$_{X,\ LowQ}$ during a time interval Treselection$_{RAT}$; or Otherwise, cell reselection to a cell on a lower priority NR frequency or inter-RAT frequency than the serving frequency shall be performed if:

The serving cell fulfils Srxlev<Thresh$_{Serving,\ LowP}$ and a cell of a lower priority RAT/frequency fulfils Srxlev>Thresh$_{X,\ LowP}$ during a time interval Treselection$_{RAT}$; and More than X second has elapsed since the UE camped on the current serving cell.

Cell reselection to a higher priority RAT/frequency shall take precedence over a lower priority RAT/frequency, if multiple cells of different priorities fulfil the cell reselection criteria.

Intra-frequency and equal priority inter-frequency cell reselection criteria is described. The cell-ranking criterion $R_s$ for serving cell and $R_n$ for neighboring cells is defined by Equation 1 below.

$$R_s = Q_{meas,s} + Q_{hyst}$$

$$R_s = Q_{meas,n} + Q\text{offset} \quad \text{[Equation 1]}$$

In Equation 1, Qmeas is reference signal received power (RSRP) measurement quantity used in cell reselections. For intra-frequency, Qoffset equals to Qoffset$_{s,n}$, if Qoffset$_{s,n}$ is valid, otherwise this equals to zero. For inter-frequency: Qoffset equals to Qoffset$_{s,n}$ plus Qoffset$_{frequency}$, if Qoffset$_{s,n}$ is valid, otherwise this equals to Qoffset$_{frequency}$.

The cells shall be ranked according to the R criteria specified above, deriving Q$_{meas,n}$ and Q$_{meas,s}$ and calculating the R values using averaged RSRP results.

If a cell is ranked as the best cell the UE shall perform cell reselection to that cell.

In all cases, the UE shall reselect the new cell, only if the following conditions are met:

the new cell is better ranked than the serving cell during a time interval Treselection$_{RAT}$;

more than 1 second has elapsed since the UE camped on the current serving cell.

Integrated access and backhaul (IAB) is described. IAB-node refers RAN node that supports wireless access to UEs and wirelessly backhauls the access traffic. IAB-donor refers RAN node which provides UE's interface to core network and wireless backhauling functionality to IAB nodes.

IAB strives to reuse existing functions and interfaces defined for access. In particular, mobile-termination (MT), gNB-distributed unit (DU), gNB-central unit (CU), UPF, AMF and SMF as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The MT function has been defined a component of the mobile equipment. MT is referred to as a function residing on an IAB-node that terminates the radio interface layers of the backhaul Uu interface toward the IAB-donor or other IAB-nodes.

Figure 5:
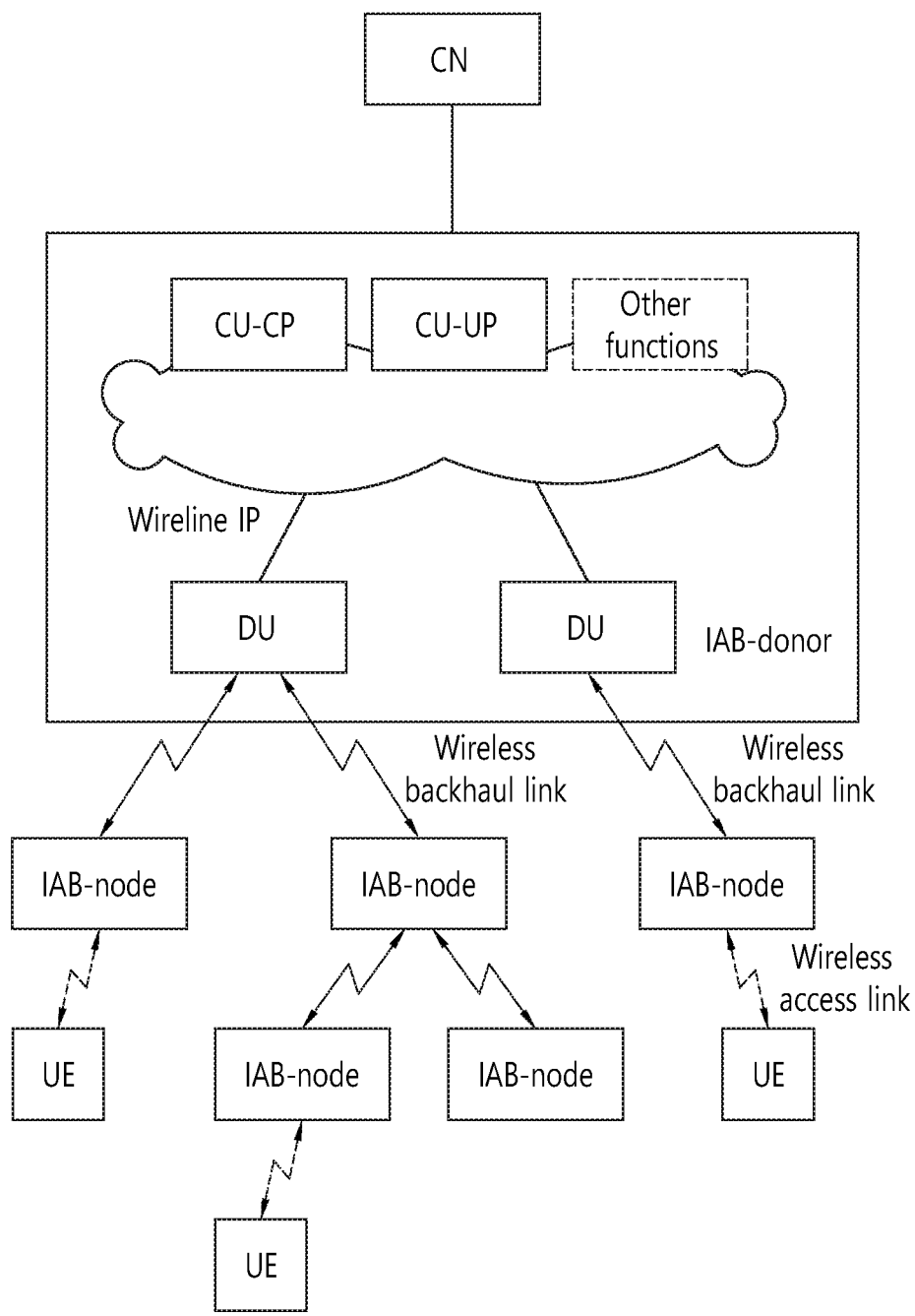
FIG. 5 shows a reference diagram for IAB in standalone mode, which contains one IAB-donor and multiple IAB-nodes.

FIG. 5 shows a reference diagram for IAB in standalone mode, which contains one IAB-donor and multiple IAB-nodes. The IAB-donor is treated as a single logical node that comprises a set of functions such as gNB-DU, gNB-CU-CP, gNB-CU-UP and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

Requirements for use cases and deployment scenarios for IAB are described below.

(1) Relay Deployment Scenarios

A key benefit of IAB is enabling flexible and very dense deployment of NR cells without densifying the transport network proportionately. A diverse range of deployment scenarios can be envisioned including support for outdoor small cell deployments, indoors, or even mobile relays (e.g. on buses or trains).

Accordingly, the Rel. 15 study item shall focus on IAB with physically fixed relays. This requirement does not preclude optimization for mobile relays in future releases.

(2) In-Band Vs. Out-of-Band Backhaul

In-band- and out-of-band backhauling with respect to the access link represent important use cases for IAB. In-band backhauling includes scenarios, where access- and backhaul link at least partially overlap in frequency creating half-duplexing or interference constraints, which imply that the IAB node cannot transmit and receive simultaneously on both links. In the present context, out-of-band scenarios are understood as not posing such constraints.

It is critical to study in-band backhauling solutions that accommodate tighter interworking between access and backhaul in compliance with half-duplexing and interference constraints.

Accordingly, the architectures considered in the study should support in-band and out-of-band scenarios. In-band IAB scenarios including (time division multiplexing (TDM)/frequency division multiplexing (FDM)/spatial division multiplexing (SDM)) of access- and backhaul links subject to half-duplex constraint at the IAB node should be supported. Out-of-band IAB scenarios should also be supported using the same set of RAN features designed for in-band scenarios. The study should identify if additional RAN features are needed for out-of-band scenarios.

(3) Access/Backhaul RAT Options

IAB can support access and backhaul in above-6 GHz- and sub-6 GHz spectrum. The focus of the study is on backhauling of NR-access traffic over NR backhaul links. Solutions for NR-backhauling of LTE-access may be included into the study.

It is further considered critical that Rel. 15 NR UEs can transparently connect to an IAB-node via NR, and that legacy LTE UEs can transparently connect to an IAB-node via LTE in case IAB supports backhauling of LTE access.

Accordingly, NR access over NR backhaul should be studied with highest priority. Additional architecture solutions required for LTE-access over NR-backhaul should be explored. The IAB design shall at least support the following UEs to connect to an IAB-node: 1) Rel. 15 NR UE, 2) legacy LTE UE if IAB supports backhauling of LTE access (4) Standalone and Non-Standalone Deployments IAB can support stand-alone (SA) and non-stand-alone (NSA) deployments. For NSA, relaying of the UE's secondary cell group (SCG) path (NR) is included in the study. Relaying of the UE's master cell group (MCG) path (LTE) is contingent on the support for IAB-based relaying of LTE-access.

The IAB node itself can operate in SA or NSA mode. While SA and NSA scenarios are included in the study, backhauling over the LTE radio interface is excluded from the study. Since E-UTRAN-NR dual connectivity (EN-DC) and SA option 2 represent relevant deployment options for early rollout of NR, EN-DC and SA option 2 for UEs and IAB-nodes has high priority in this study. Other NSA deployment options or combinations of SA and NSA may also be explored and included in the study.

Accordingly, SA and NSA shall be supported for the access link. For an NSA access link, relaying is applied to the NR path. Relaying of the LTE path is contingent on the support of backhauling of LTE traffic. Both NSA and SA shall be studied for the backhaul link. Backhaul traffic over the LTE radio interface is excluded from the study. For NSA access- and backhaul links, the study shall consider EN-DC with priority. However, other NSA options shall not be precluded from the study.

Architecture requirements for IAB are described below.

(1) Multi-Hop Backhauling

Multi-hop backhauling provides more range extension than single hop. This is especially beneficial for above-6 GHz frequencies due to their limited range. Multi-hop backhauling further enables backhauling around obstacles, e.g. buildings in urban environment for in-clutter deployments.

The maximum number of hops in a deployment is expected to depend on many factors such as frequency, cell density, propagation environment, and traffic load. These factors are further expected to change over time. From the architecture perspective, flexibility in hop count is therefore desirable.

With increasing number of hops, scalability issues may arise and limit performance or increase signaling load to unacceptable levels. Capturing scalability to hop count as a key performance indicator (KPI) is therefore an important aspect of the study.

Accordingly, IAB design shall support multiple backhaul hops. The architecture should not impose limits on the number of backhaul hops. The study should consider scalability to hop-count an important KPI. Single hop should be considered a special case of multiple backhaul hops.

(2) Topology Adaptation

Wireless backhaul links are vulnerable to blockage, e.g., due to moving objects such as vehicles, due to seasonal changes (foliage), or due to infrastructure changes (new buildings). Such vulnerability also applies to physically stationary IAB-nodes. Also, traffic variations can create uneven load distribution on wireless backhaul links leading to local link or node congestion.

Topology adaptation refers to procedures that autonomously reconfigure the backhaul network under circumstances such as blockage or local congestion without discontinuing services for UEs.

Accordingly, topology adaptation for physically fixed relays shall be supported to enable robust operation, e.g., mitigate blockage and load variation on backhaul links.

(3) L2- and L3-Relay Architectures

There has been extensive work in 3GPP on Layer 2 (L2) and Layer 3 (L3) relay architectures. Leveraging this work may reduce the standardization effort for IAB. The study can further establish an understanding of the tradeoff between L2- and L3-relaying in the context of IAB.

(4) Core-Network Impact

IAB-related features such as IAB-node integration and topology adaptation may impact core-network specifications. It is desirable to minimize the impact to core-network specifications related to IAB.

Also, dependent on design, IAB features may create additional core-network signaling load. The amount of signaling load may vary among the various designs discussed in the study. Core-network signaling load is therefore considered an important KPI for the comparison of IAB designs.

Accordingly, the IAB design shall strive to minimize the impact to core network specifications. The study should consider the impact to the core network signaling load as an important KPI.

(5) Reuse of Rel-15 NR

Leveraging existing Rel-15 NR specifications can greatly reduce the standardization effort for the backhaul link.

The backhaul link may have additional requirements, which are not addressed in Rel-15 NR. For instance, both link end points of the backhaul link are expected to have similar capabilities. It may therefore be desirable to consider enhancements to Rel-15 NR specifications for the backhaul link.

Accordingly, the study should strive to maximize the reuse of Rel-15 NR specifications for the design of the backhaul link. Enhancement can also be considered.

In NR, path reselection problem can be seriously occurred. Since NR network nodes, e.g. IAB nodes, are connected with forming multiple hops, a suitable path should be selected. Such path reselection scheme is necessary to support service continuity so as to avoid radio link failure (RLF).

However, legacy path reselection procedure, e.g. cell reselection procedure, only considers cell quality, e.g. RSRP and/or reference signal received quality (RSRQ), for path reselection conditions. Moreover, various data characteristic (e.g. 5G QoS indicator (5QI), QoS class identifier (QCI) level, delay tolerant) of NR network nodes are not considered for path reselection. Therefore, it is necessary how to determine and reselect the suitable path based on various factors.

According to an embodiment of the present invention, various factors may be considered for path reselection in IAB relaying operation, as well as cell quality (e.g. RSRP/RSRQP). For example, 5QI may be considered for one of various factors for path reselection in IAB relaying operation. 5QI may be applied to QoS parameter, and may be reflected and/or mapped to detailed characteristic of specific data flow. For another example, congestion level may be considered for one of various factors for path reselection in IAB relaying operation. A certain congestion level of the hop may be different since each node works as a UE and backhauling, respectively. The path (re)selection may be performed by distributed manner. When path (re)selection with the distributed manner is applied, assistance information (e.g. periodic, event triggered) would be not be necessary among nodes.

Figure 6:
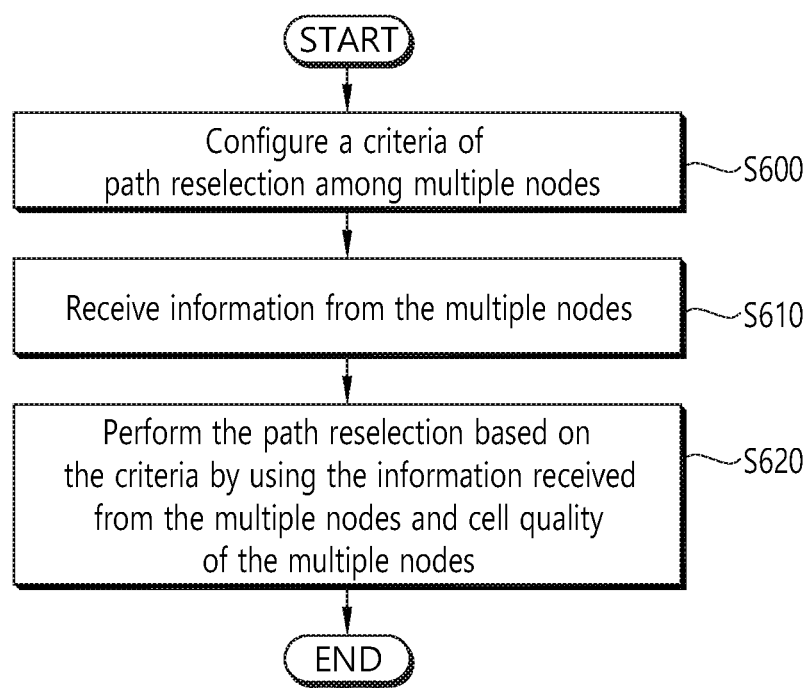
FIG. 6 shows an example of a method performed by a node according to an embodiment of the present invention.

FIG. 6 shows an example of a method performed by a node according to an embodiment of the present invention. The node may be an IAB node. In this embodiment, the node performs path reselection in IAB relaying operation according to an embodiment of the present invention. The technology for IAB relaying operation may be performed via various links (i.e. Uu and PC5). The IAB relaying operation may be applied to various networks (e.g. NR). It is assumed that the donor gNB is connected to 5G core network, and multiple nodes are connected to the donor gNB via Uu.

In step S600, the node configures a criteria of path reselection among multiple nodes. The criteria of path reselection may be applied to legacy cell-ranking criterion $R_s$ for serving cell and $R_n$ for neighboring cells in cell reselection procedure described above. Or, a new criteria for path reselection may be configured for serving cell and neighboring cells.

Additionally, various factors other than cell quality may be configured for criteria of path reselection. The various factors for criteria of path reselection may include at least one of the followings.

Congestion level: How many nodes or UEs are connected the corresponding node
Latency: Latency from the corresponding node to 5G core network
Number of hops: How many nodes are connected from the corresponding node to 5G core network
Supported QoS level or 5QI: How QoS level or 5QI is supported with relaying bearers
Supported slice or service type: one of enhanced mobile broadband (eMBB), ultra-low latency communications (URLLC) or massive internet-of-things (MIoT)

Furthermore, hysteresis value may be configured for criteria of path reselection. The hysteresis value may be applied to the criteria of path reselection.

In step S610, the node receives information from the multiple nodes. The information may include at least one of the various factors configured for criteria of path reselection described above, i.e. congestion level, latency, number of hops, supported QoS level or 5QI, or supported slice or service type. That is, the node may receive information on various factors configured for criteria of path reselection from each of the multiple nodes.

The information on various factors configured for criteria of path reselection may include an offset of various factors configured for criteria of path reselection. For example, the node may receive offset 1-1 for congestion level of node 1 and offset 1-2 for latency of node 1, and may receive offset 2-1 for congestion level of node 2 and offset 2-2 for latency of node 2.

When the hysteresis value is configured for criteria of path reselection, the information on various factors configured for criteria of path reselection may include configured threshold and hysteresis value.

Each node among the multiple node may broadcast information on various factors configured for criteria of path reselection. In this case, each node may broadcast each offset of various factors configured for criteria of path reselection. Alternatively, each node may broadcast sum of offsets of various factors configured for criteria of path reselection.

In step S620, the node performs the path reselection based on the criteria by using the information received from the multiple nodes and cell quality of the multiple nodes.

If the information received from the multiple nodes includes offsets of various factors configured for criteria of path reselection of each node, the node may apply the offsets of various factors configured for the criteria of path reselection of each node to the criteria of path reselection. For example, if the criteria of path reselection is applied to the legacy cell-ranking criterion $R_s$ for serving cell and $R_n$ for neighboring cells, the offset of various factors configured for the criteria of path reselection of each node may also be applied to the legacy cell-ranking criterion $R_s$ for serving cell and $R_n$ for neighboring cells, like Qoffset shown in Equation 1. That is, the offset of various factors configured for the criteria of path reselection of each node may be differentiate rankings of each node for path reselection.

If the information received from the multiple nodes includes multiple offsets of various factors configured for criteria of path reselection of each node, one of the following options may be applied to the criteria of path reselection.

Option 1: Based on the priority or slice type or service type, one of offset value for QoS, 5QI, latency, congestion may be applied.
Option 2: The minimum value or maximum value of the multiple offsets may be applied.

If the information received from the multiple nodes includes configured threshold and hysteresis value, the node may determine whether to perform the path reselection or not based on the criteria by using the information received from the multiple nodes and cell quality of the multiple node. When offset value (or sum of offsets) is above the configured threshold and hysteresis value compared to previous offset value, the node may perform path reselection. Alternatively, when offset value (or sum of offsets) is below the configured threshold and hysteresis value compared to previous offset value, the node may not perform the path reselection.

According to embodiment of the present invention shown in FIG. 6, path reselection for IAB relaying operation can be performed efficiently so that RLF can be avoided.

Figure 7:
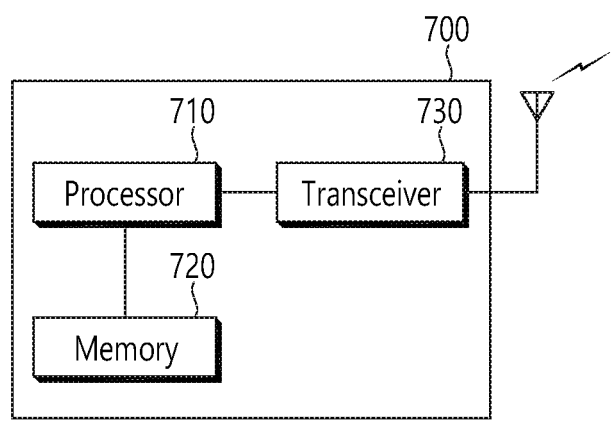
FIG. 7 shows a node to implement an embodiment of the present invention.

FIG. 7 shows a node to implement an embodiment of the present invention.

A node 700 includes a processor 710, a memory 720 and a transceiver 730. The processor 610 may be configured to implement proposed functions, procedures and/or methods described in this description. Layers of the radio interface protocol may be implemented in the processor 710.

Specifically, the processor 710 is configured to configure a criteria of path reselection among multiple nodes. The processor 710 is configured to control the transceiver 730 to receive information from the multiple nodes. The processor 710 is configured to perform the path reselection based on the criteria by using the information received from the multiple nodes and cell quality of the multiple nodes.

The information may include at least one of information on a congestion level for each of the multiple nodes, information on a latency for each of the multiple nodes, information on a number of hops for each of the multiple nodes, information on a QoS level for each of the multiple nodes, or information on slice and/or service type for each of the multiple nodes. The information on the congestion level for each of the multiple nodes may indicate how many nodes or UEs are connected to each of the multiple nodes. The information on the latency for each of the multiple nodes may indicate a latency from each of the multiple nodes to a core network. The information on the number of hops for each of the multiple nodes may indicate how many nodes are connected from each of the multiple odes to a core network. The information on the QoS level for each of the multiple nodes may indicate a supported QoS level or 5QI for relaying bearers. The information on the slice and/or the service type for each of the multiple nodes may indicate one of eMBB, URLLC, or MIoT.

The information may indicate an offset for the criteria of the path reselection. The information may include a hysteresis value for the criteria of the path reselection. The node may be an IAB node.

The memory 720 is operatively coupled with the processor 710 and stores a variety of information to operate the processor 710. The transceiver 730 is operatively coupled with the processor 710, and transmits and/or receives a radio signal.

The processor 710 may include application-specific integrated circuit (ASIC), other chipset, logic circuit and/or data processing device. The memory 720 may include read-only memory (ROM), random access memory (RAM), flash memory, memory card, storage medium and/or other storage device. The transceiver 730 may include baseband circuitry to process radio frequency signals. When the embodiments are implemented in software, the techniques described herein can be implemented with modules (e.g., procedures, functions, and so on) that perform the functions described herein. The modules can be stored in the memory 720 and executed by the processor 710. The memory 720 can be implemented within the processor 710 or external to the processor 710 in which case those can be communicatively coupled to the processor 710 via various means as is known in the art.

According to embodiment of the present invention shown in FIG. 7, path reselection for IAB relaying operation can be performed efficiently so that RLF can be avoided.

Figure 8:
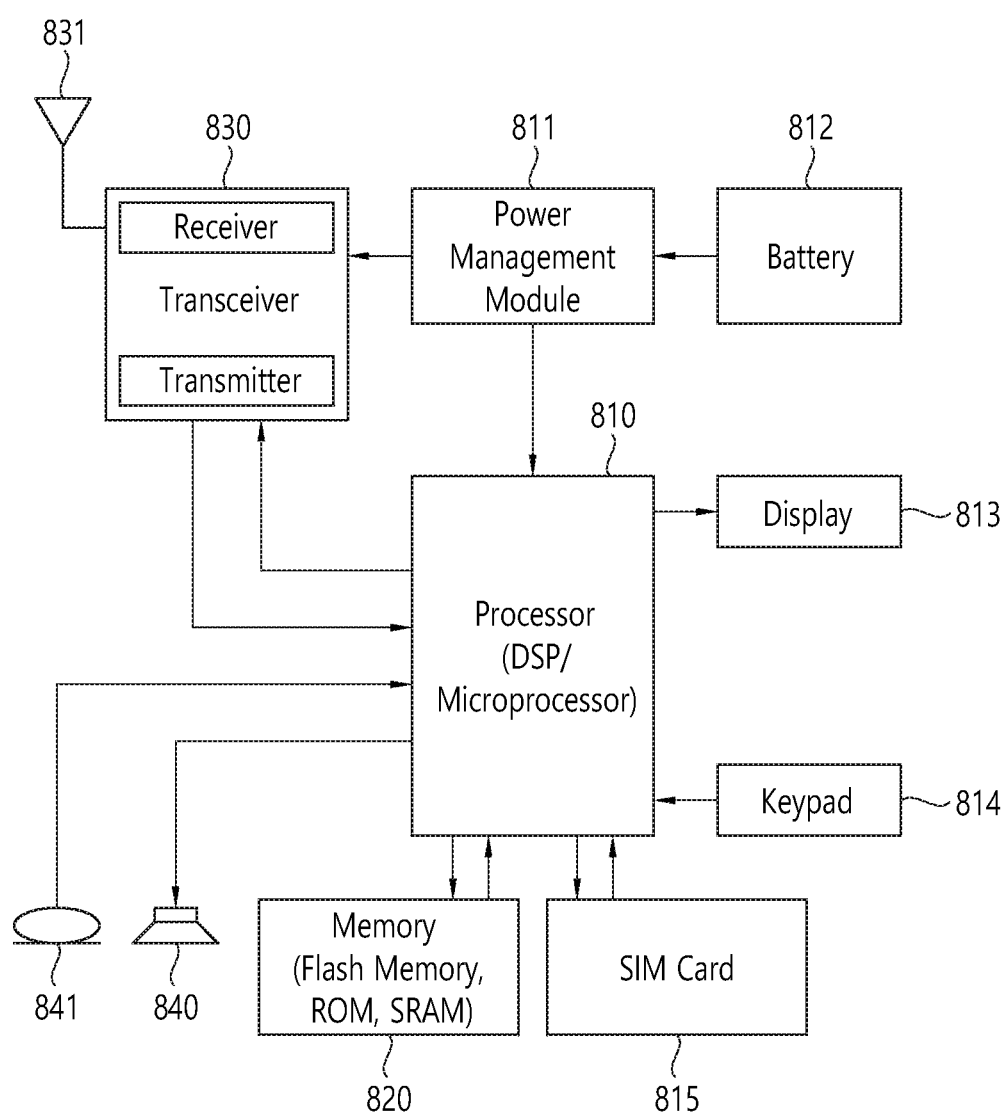
FIG. 8 shows more detailed node to implement an embodiment of the present invention.

FIG. 8 shows more detailed node to implement an embodiment of the present invention.

A node includes a processor 810, a power management module 811, a battery 812, a display 813, a keypad 814, a subscriber identification module (SIM) card 815, a memory 820, a transceiver 830, one or more antennas 831, a speaker 840, and a microphone 841.

The processor 810 may be configured to implement proposed functions, procedures and/or methods described in this description. Layers of the radio interface protocol may be implemented in the processor 810. The processor 810 may include ASIC, other chipset, logic circuit and/or data processing device. The processor 810 may be an application processor (AP). The processor 810 may include at least one of a digital signal processor (DSP), a central processing unit (CPU), a graphics processing unit (GPU), a modem (modulator and demodulator). An example of the processor 810 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 810 is configured to control the node to configure a criteria of path reselection among multiple nodes. The processor 810 is configured to control the transceiver 830 to receive information from the multiple nodes. The processor 810 is configured to perform the path reselection based on the criteria by using the information received from the multiple nodes and cell quality of the multiple nodes.

The information may include at least one of information on a congestion level for each of the multiple nodes, information on a latency for each of the multiple nodes, information on a number of hops for each of the multiple nodes, information on a QoS level for each of the multiple nodes, or information on slice and/or service type for each of the multiple nodes. The information on the congestion level for each of the multiple nodes may indicate how many nodes or UEs are connected to each of the multiple nodes. The information on the latency for each of the multiple nodes may indicate a latency from each of the multiple nodes to a core network. The information on the number of hops for each of the multiple nodes may indicate how many nodes are connected from each of the multiple odes to a core network. The information on the QoS level for each of the multiple nodes may indicate a supported QoS level or 5QI for relaying bearers. The information on the slice and/or the service type for each of the multiple nodes may indicate one of eMBB, URLLC, or MIoT.

The information may indicate an offset for the criteria of the path reselection. The information may include a hysteresis value for the criteria of the path reselection. The node may be an IAB node.

The power management module 811 manages power for the processor 810 and/or the transceiver 830. The battery 812 supplies power to the power management module 811. The display 813 outputs results processed by the processor 810. The keypad 814 receives inputs to be used by the processor 810. The keypad 814 may be shown on the display 813. The SIM card 815 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 820 is operatively coupled with the processor 810 and stores a variety of information to operate the processor 810. The memory 820 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various means as is known in the art.

The transceiver 830 is operatively coupled with the processor 810, and transmits and/or receives a radio signal. The transceiver 830 includes a transmitter and a receiver. The transceiver 830 may include baseband circuitry to process radio frequency signals. The transceiver 830 controls the one or more antennas 831 to transmit and/or receive a radio signal.

The speaker 840 outputs sound-related results processed by the processor 810. The microphone 841 receives sound-related inputs to be used by the processor 810.

According to embodiment of the present invention shown in FIG. 8, path reselection for IAB relaying operation can be performed efficiently so that RLF can be avoided.

Figure 9:
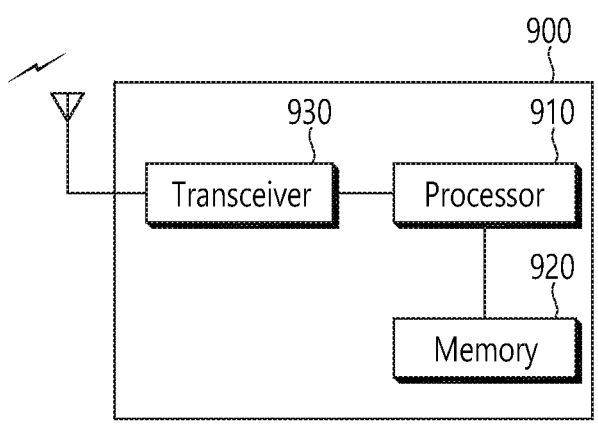
FIG. 9 shows other node to implement an embodiment of the present invention.

FIG. 9 shows other node to implement an embodiment of the present invention.

Other node 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processor 910 may include ASIC, other chipset, logic circuit and/or data processing device. The memory 920 may include ROM, RAM, flash memory, memory card, storage medium and/or other storage device. The transceiver 930 may include baseband circuitry to process radio frequency signals. When the embodiments are implemented in software, the techniques described herein can be implemented with modules (e.g., procedures, functions, and so on) that perform the functions described herein. The modules can be stored in the memory 920 and executed by the processor 910. The memory 920 can be implemented within the processor 910 or external to the processor 910 in which case those can be communicatively coupled to the processor 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by an integrated access and backhaul (IAB) node in a wireless communication system, the method comprising:

configuring a criteria for path reselection based on at least one factor, receiving, from multiple nodes, information related to the at least one factor from the multiple nodes;

performing the path reselection, by selecting one of the multiple nodes as an IAB donor for providing a wireless backhaul link to the IAB node, based on the criteria, the received information and cell quality of the multiple nodes; and performing wireless relaying of data for a user equipment (UE) through the wireless backhaul link between the IAB node and the IAB donor and an access link between the IAB node and the UE by performing wireless backhaul link communication with the IAB donor based on a Uu interface, wherein each of the multiple nodes is capable of providing at least one wireless backhaul link, and wherein the information is related to at least one of:
a latency from the each of the multiple nodes to a core network,
a number of hops between the each of the multiple nodes and the core network,
a quality of service (QoS) level supported by the each of the multiple nodes, or
a slice and/or a service type supported by the each of the multiple nodes.

2. The method of claim 1, wherein the information includes at least one of information on a congestion level related to each of the multiple nodes, information on the latency related to each of the multiple nodes, information on a number of hops related to each of the multiple nodes, information on the QoS level related to each of the multiple nodes, or information on the slice and/or service type related to each of the multiple nodes.

3. The method of claim 2, wherein the information on the congestion level indicates how many nodes or user equipment (UEs) are connected to each of the multiple nodes.

4. The method of claim 2, wherein the information on the QoS level indicates a supported QoS level or 5G QoS indicator (5QI) for relaying bearers.

5. The method of claim 2, wherein the information on the slice and/or the service type indicates one of enhanced mobile broadband (eMBB), ultra-reliable and low latency communications (URLLC), or massive internet-of-things (MIoT).

6. The method of claim 1, wherein the receiving the information related to the at least one factor comprises:
receiving, from each of the multiple nodes, at least one offset related to the at least one factor for the criteria.

7. The method of claim 1, wherein the information includes a hysteresis value for the criteria for the path reselection.

8. The method of claim 1, wherein the at least one factor comprises a parameter related to a characteristic of a data flow.

9. The method of claim 1, wherein the information related to the at least one factor is broadcasted by each of the multiple nodes.

10. The method of claim 1, wherein the wireless backhaul link communication is performed based on a F1 interface.

11. The method of claim 1, wherein the receiving the information related to the at least one factor comprises:
receiving, from each of the multiple nodes, a sum of a first offset for a first factor among the at least one factor and a second offset for a second factor among the at least one factor.

12. An integrated access and backhaul (IAB) node in a wireless communication system, the IAB node comprising:
a transceiver; and a processor coupled to the transceiver, and configured to:
configures a criteria for path reselection based on at least one factor,
receive, from multiple nodes, information related to the at least one factor,
perform the path reselection, by selecting one of the multiple nodes as an IAB donor for providing a wireless backhaul link to the IAB node, based on the criteria, the received information and cell quality of the multiple nodes, and
performing wireless relaying of data for a user equipment (UE) through the wireless backhaul link between the IAB node and the IAB donor and an access link between the IAB node and the UE by performing wireless backhaul link communication with the IAB donor based on a Uu interface,
wherein each of the multiple nodes is capable of providing at least one wireless backhaul link, and
wherein the information is related to at least one of:
- a latency from the each of the multiple nodes to a core network,
- a number of hops between the each of the multiple nodes and the core network,
- a quality of service (QoS) level supported by the each of the multiple nodes, or
- a slice and/or a service type supported by the each of the multiple nodes.

13. The IAB node of claim 12, wherein the information includes at least one of information on a congestion level related to each of the multiple nodes, information on the latency related to each of the multiple nodes, information on a number of hops related to each of the multiple nodes, information on the QoS level related to each of the multiple nodes, or information on the slice and/or service type related to each of the multiple nodes.

14. The IAB node of claim 13, wherein the information on the congestion level indicates how many nodes or user equipment (UEs) are connected to each of the multiple nodes.

15. The IAB node of claim 13, wherein the information on the QoS level indicates a supported QoS level or 5G QoS indicator (5QI) for relaying bearers.

16. The IAB node of claim 13, wherein the information on the slice and/or the service type indicates one of enhanced mobile broadband (eMBB), ultra-reliable and low latency communications (URLLC), or massive internet-of-things (MIoT).

17. The IAB node of claim 12, wherein the information comprises at least one offset related to the at least one factor for the criteria.

18. The IAB node of claim 12, wherein the information includes a hysteresis value for the criteria for the path reselection.

* * * * *